Figure 3:
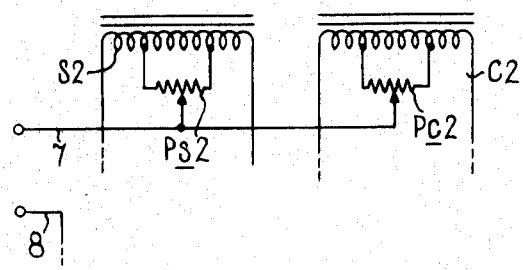

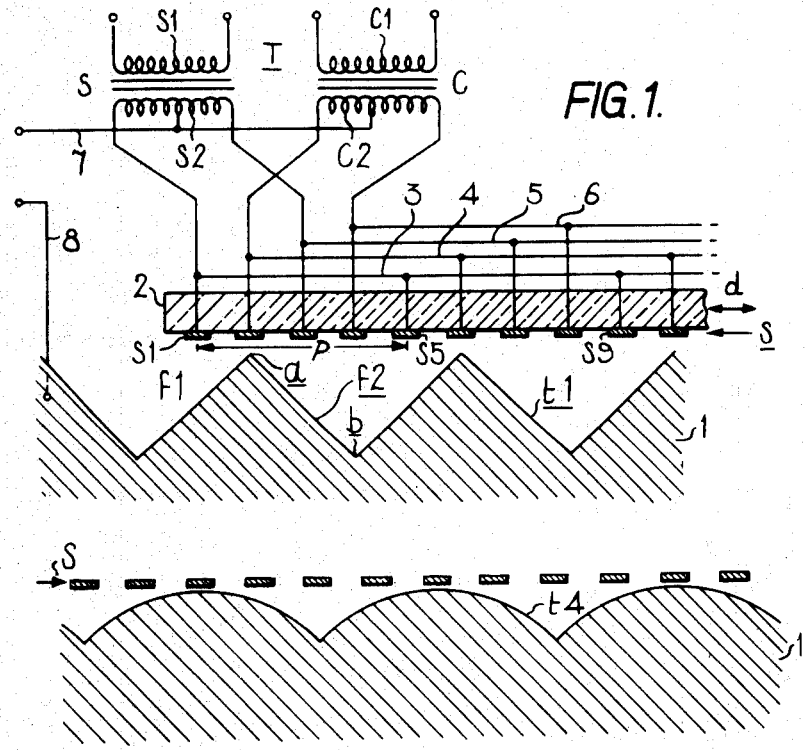
FIG. 1.
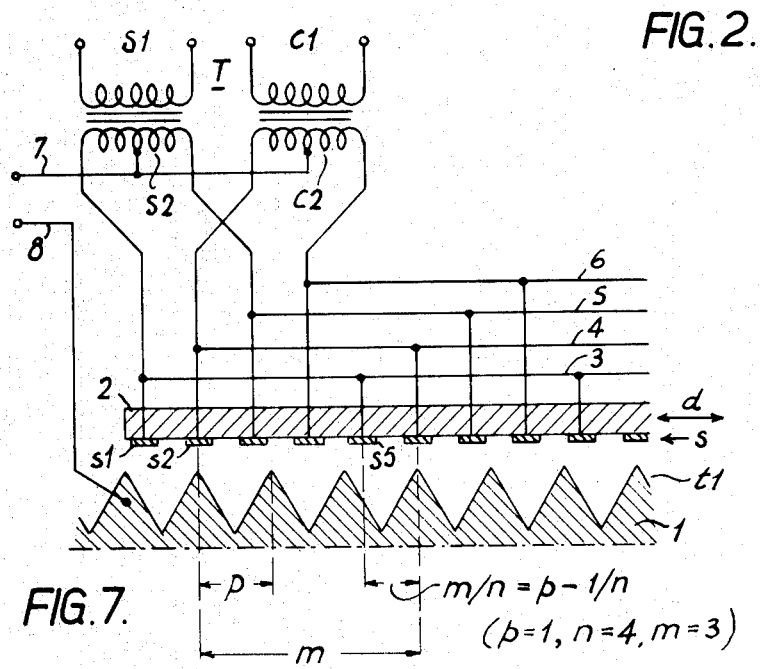
FIG. 2.
FIG. 7.

Dec. 7, 1965 D. J. MYNALL 3,222,591
APPARATUS FOR PRODUCING SIGNALS INDICATIVE OF RELATIVE POSITION
Filed Nov. 20, 1963 2 Sheets-Sheet 2

United States Patent Office 3,222,591
Patented Dec. 7, 1965

3,222,591
APPARATUS FOR PRODUCING SIGNALS
INDICATIVE OF RELATIVE POSITION
Dennis J. Mynall, Rugby, England, assignor to Associated Electrical Industries Limited, London, England, a British company
Filed Nov. 20, 1963, Ser. No. 325,010
Claims priority, application Great Britain, Nov. 23, 1962, App. 44,455/62
10 Claims. (Cl. 323—61)

This is a continuation-in-part of my copending application Serial No. 201,100 filed on June 8, 1962 and now abandoned.

This invention relates to apparatus for producing electrical signals which are indicative of the positional relationship within prescribed limits, of two relatively movable members with respect to each other.

It is well known to obtain electric signals related to the positional relationship of two members by means of a rotary position-sensitive device (synchro) having inductively coupled windings provided on relatively rotatable parts of the device (rotor and stator) which are mechanically coupled to the two members in question. Thus in the case for instance of a resolver synchro having a single-phase winding on one of its two relatively rotatable parts and a two-phase winding on its other part, it is possible by applying an alternating voltage to the single-phase winding to obtain from the two-phase winding voltages whose amplitudes depend on the instantaneous angular relationship of the windings and respectively vary in sinusoidal and cosinusoidal fashion as this angular relationship changes during rotation. Alternatively, by exciting the two-phase winding with appropriately related voltages there can be obtained from the single-phase winding an output voltage which as regards its amplitude and sign will depend both on the angular relationship of the two windings and on the amplitude ratio of the exciting voltages.

In employing these known rotary inductive devices to obtain signals indicative of the position of a moving member of a machine or instrument it is often necessary to introduce a mechanical coupling by which the movement of such member is converted so as to be more suitable for application to the rotary member of the device, for instance a rack and pinion coupling giving conversion from linear to rotary motion. Such mechanical coupling, especially as it becomes worn with use, can introduce a significant loss of accuracy. It is one object of the present invention to provide an apparatus which can serve the same basic function but whose parts may be mounted directly on, or even made integral with, those members of a machine or instrument whose positional relationship it is desired to indicate or control.

There has also been previously proposed, for providing indication of the positional relationship of two members, a device comprising two relatively movable parts which are arranged in sensible capacitive proximity and of which the facing surfaces have similar "toothed" profiles each having the same "tooth pitch" and each presenting a rectangular tooth form. As the two parts are moved relatively so as to move the teeth of one past the teeth of the other, there is a cyclic variation of the capacitance between the two parts and this can be measured to indicate the instantaneous positional relationship of the two parts within a range corresponding to one tooth pitch. One or each of the two parts can have a second series of teeth electrically separate from the first series but positionally related thereto in such manner (for instance by providing the teeth of the second series at positions midway between those of the first series) that the two series are in effect positionally displaced with respect to each other by half a tooth pitch, so that the capacitance between the first series and the facing toothed profile will vary in opposite sense to that between the second series and the facing toothed profile: that is, as the one capacitance is increasing the other will be decreasing and vice versa, or in other words, the capacitance variations will be in anti-phase with respect to each other. With such an arrangement however the variations of capacitance are the same for direction of movement, with the result that no indication of the direction of movement or relative displacement can be derived from the electrical output: that is the device is not direction sensitive which is a requirement, for instance, in respect of certain machine tool control systems employing position sensing devices.

According to the present invention as initially conceived, an apparatus for providing electrical signals indicative of positional relationship comprises two relatively movable members of which the first has an electrically conductive surface having a "toothed" profile and the second has a plurality of equally spaced conductive strips, at least three per tooth pitch, disposed in sensible capacitive proximity to the teeth of the first member and extending transversely of the direction of relative movement between the two members, those strips which have a similar positional relationship with respect to the teeth of the first member being electrically connected together as a set and the several sets being connected to a static or rotary transformer arrangement for correlating in a positional output signal therefrom the cyclic variations of capacitance which will occur between the toothed member and the several sets of strips during relative movement between the two members.

The equal spacing of the strips is necessary to obtain regular variations of capacitance and the provision of at least three strips per tooth pitch has the result that the cyclic variations of capacitance between the toothed member and the respective sets of strips will have a phase difference of substantially less than 180° (namely 120° for three sets—that is, three strips per tooth pitch—90° for four sets, and so on). Consequently the capacitance variations will be different for different directions of movement, thereby permitting directional discrimination.

This form of apparatus as initially conceived is satisfactory provided that the tooth pitch is sufficiently great for at least three strips to be accommodated within it, it being appreciated that the centre-to-centre spacing of the strips is a fraction of a tooth pitch determined by the number of strips per tooth pitch. However for position-sensing within fine limits (these limits being a function of the tooth pitch) the tooth pitch may be so small as to make the manufacture of the strip system a matter of considerable difficulty owing to the consequently small width and spacing measurements imposed on the strips. For instance if the toothed member is a wheel whose angular position is to be sensed within a few seconds of arc, a very large number of teeth is required in the toothed member and even with a big wheel it is difficult to provide three strips within a tooth pitch.

This manufacturing problem can be eased without departing from the basic concept of the invention but at the sacrifice of some sensitivity, by spacing the strips so that they have a greater centre-to-centre spacing which differs from an integral number of tooth pitches by a distance equal to one tooth pitch divided by an integer (greater than two) equal to the number of sets of strips.

In general therefore, in an apparatus according to the invention the relationship between the spacing of the strips and the tooth pitch of the toothed profile can be expressed in the form $m = pn \pm 1$ where $n$ is the number of sets of strips, which as before is greater than 2, $p$ is an arbitrary number, and $m$ is an integral number of tooth pitches which will correspond to the centre-to-centre distance between successive strips belonging to the same set, the centre-to-centre distance between adjacent strips (from different sets) being then $m/n = (p \pm 1/n)$ tooth pitches. For the form of apparatus with three or more strips per tooth pitch ($n \not< 3$), $p$ is zero in the above expressions so that $m$ is unity, and the strip spacing is equal to $1/n^{th}$ of a tooth pitch.

For the form with the greater strip spacing, $p$ is a positive integer which as at present envisaged may conveniently be 1 (unit). Thus, if the number of sets of strips is $n=4$ and $p$ is arbitrarily taken as unity, the centre-to-centre distance between successive strips in the same set may be $m=3$ or 5 tooth pitches and the corresponding distance between adjacent strips will then be $m/n=¾$ or 1¼ (that is $1 \pm ¼$) tooth pitches. For three sets of strips and $p=1$, $m$ can be 2 or 4 tooth pitches. As the capacitance variation is cyclic, going through one cycle of variation for a relative movement corresponding to one tooth pitch, the relative phases of the capacitance variations between the toothed member and the several sets of strips are determined only by the fractional difference from an integral number of tooth pitches in the centre-to-centre distance between adjacent strips. As this fractional difference is $1/n^{th}$ of a tooth pitch in the form of the apparatus with the greater strip spacing it will be apparent that, so far as the relative phasing of capacitance variations are concerned, the arrangement is equivalent to the basic form in which with $n$ strips per tooth pitch the centre-to-centre distance of adjacent strips is also $1/n^{th}$ of a tooth pitch. The centre-to-centre strip distance is greater, however, leading to easier manufacture but with some loss of sensitivity because of the fewer number of strips within a given distance. The greater ease of manufacture arises from the fact that the strips may be made approximately $m$ times wider than is possible with the basic form.

The form chosen for the toothed profile will depend on, and can be calculated according to, the particular output vis-a-vis displacement characteristic which is required, the distance apart of the strips, the clearance between them and the toothed profile, and the shape of the "pitch line" of the teeth, namely whether it is linear or curved and, if curved, whether the strips are on the concave or convex side of the curve. Thus for a close approximation to a sinusoidal characteristic with a linear toothed profile (that is, one having a linear pitch line) and clearance not less than one-sixth of the tooth pitch, a suitable profile is one constituted by a series of convex arcs each approximating to an arc of a circle with adjacent arcs meeting at an angle of substantially 90°.

In carrying out the invention the strips and the teeth may extend at right angles to the direction of relative movement or one or other may be skewed. Alternatively the teeth may be constituted by successive turns of a helical thread (like a screw thread) and the sets of strips may then be constituted by respective single helical strips coaxial with the tooth helix and interlaid with each other. As indicated above, the pitch line of the toothed profile may be linear or curved, in which event the toothed member may correspondingly be linear or curved. If curved, the pitch line may be a complete circle or other closed figure, in which event the toothed member may be a complete wheel or ring.

Figure 4:
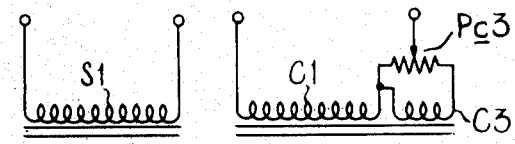
Figure 5:
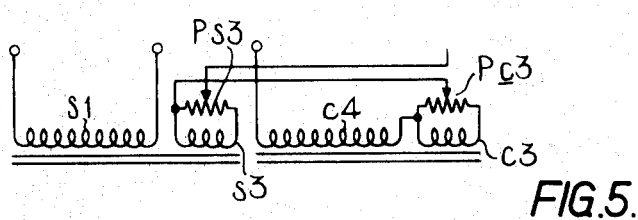
Figure 6:
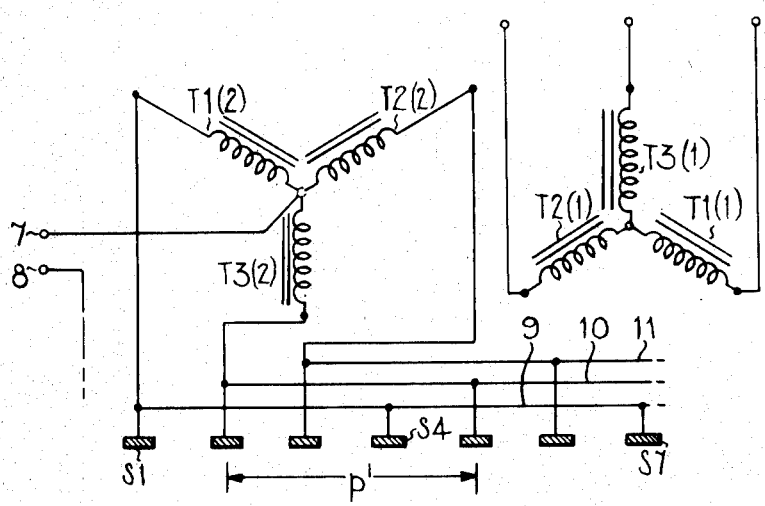

The invention may be more easily understood following consideration of various embodiments thereof which will now be described with reference to the accompanying drawings, in which:

FIG. 1 illustrates an embodiment having four strips per tooth pitch connected into four sets, FIG. 2 illustrates a preferred form of tooth profile, FIGS. 3, 4 and 5 show modifications of the transformer arrangement permitting trimming adjustment to be made in order to compensate for certain possible errors arising from manufacturing tolerances, FIG. 6 illustrates an embodiment having three strips per tooth connected into three sets, and FIG. 7 illustrates an embodiment in which there are again four sets of strips but in which, in conformity with the expression $m = pn \pm 1$, taking the negative sign and $p=1$, the centre-to-centre spacing ($m$) of successive strips in the same set is equal to three tooth pitches and the spacing ($m/n$) of adjacent strips is ¾ of a tooth pitch.

In carrying out the invention an arrangement using four strips per tooth is preferred owing to the relative simplicity of its transformer arrangement and of the provision of means for effecting trimming adjustments. Referring to FIG. 1 the apparatus there illustrated comprises a first member 1 having a triangular toothed profile $t1$ of tooth pitch P, a second member 2 carrying a plurality of strips $s$ ($s1$–$s10$, seen in cross-section) which are sufficiently close to the toothed profile $t1$ to be in sensible capacitive relationship with it, and a transformer arrangement comprising a first transformer S having mutually coupled windings S1 and S2 and a second, similar, transformer C having mutually coupled windings C1 and C2. Only fragments of the members 1 and 2 have been shown: the member 2 would usually be considerably shorter than the toothed member 1.

The strips $s$, of which there are four per tooth pitch P, are equally spaced and extend transversely to the direction (indicated by line $d$) of the relative movement between the members 1 and 2. Strips separated by a pole pitch are connected together as a set. Thus, starting at the strip furthest to the left in FIG. 1, a permanent electrical connection is made between the 1st, 5th, 9th, . . . strips (connection 3), between the 2nd, 6th, 10th, . . . strips (connection 4), between the 3rd, 7th, . . . strips (connection 5) and between the 4th, 8th, . . . strips (connection 6). Thus there are four electrically independent sets of strips with an equal number of interconnected strips, one tooth pitch apart, in each set. As the action of the arrangement depends essentially on variation of capacitive coupling between the toothed member 1 and the conductive strips $s$ on the other member, it is necessary for the connections 3, 4, 5, 6 to be disposed at the side or back of the member 2 on which they are provided, so that these connections will play no significant part in the capacitive coupling.

The connections 3 and 5 of the sets of strips including the first and third strips respectively are connected to opposite ends of the winding S2 of transformer S. The connections 2 and 4 of the sets of strips including the second and fourth strips are connected to opposite ends of the winding C2 of transformer C. A common connection 7 is taken to the centres of windings S2 and C2, and a further connection 8 (which may be an earth connection) is taken to the member 1.

For a preliminary consideration of the mode of operation, let it be assumed that an alternating voltage is applied between the member 1 (by connection 8) and the common connection 7 to the transformers. First consider the two members 1 and 2 in the positional relationship shown in FIG. 1. The strip $s2$ is immediately opposite the apex $a$ of a tooth, as are also strips $s6$, $s10$, . . . Strips $s4$, $s8$, . . . are each half-way between two teeth and therefore opposite the base angle $b$ between these teeth, while strips $s1$, $s5$, . . . on the one hand and strips $s3$, $s7$, . . . on the other hand are symmetrically disposed with respect to, and opposite respective flanks $f1$, $f2$ of the teeth. The capacitive coupling between the strips $s1$, $s5$, . . . and the toothed member 1 is therefore the same as that between the strips $s3$, $s7$, . . . and the toothed member 1, so that there will be substantially equal but opposite currents in each half of the transformer winding (S2) to which these strips are connected and therefore zero or minimum output from the other winding S1 of the transformer S. On the other hand not only will the capacitive coupling between strips $s2$, s6, . . . and the toothed member 1 be different from that between strips s4, s8, . . . and the toothed member, but the difference will be a maximum. The difference between the currents in each half of the transformer winding (C2) to which these strips are connected will therefore be a maximum, so that the voltage induced in the winding C1 of the transfermer C will also be a maximum.

On relative movement between the strips s and the toothed member 1 in the direction d, the output voltage in winding S1 of the transformer S will gradually increase, and that in winding C1 of transformer C will gradually decrease, until after relative movement through a quarter of a tooth pitch the output voltage of transformer S will be a maximum, and that of transformer C will be minimum. The relation between the amplitude variation of the voltage with variation of the relative position will approximate more closely to sinusoidal if instead of being triangular the teeth are in the form of circular arcs t4 meeting at right angles as illustrated in FIG. 2. The amplitudes of the output voltages of the two transformers S and C as plotted against relative displacement are displaced by a quarter of a tooth pitch, so that if a tooth pitch is taken as corresponding to 360° (electrical), the amplitudes of the two output voltages can be said to be varying sinusoidally and cosinusoidally respectively. Thus with appropriately chosen geometrical proportions, which are susceptible of precise calculation as previously indicated, the individual variations of the output voltages may be made closely sinusoidal when plotted against the relative position of the members, and one output can be regarded as a sine output and the other as a cosine output.

Just as it is possible with a resolver synchro to excite the sine and cosine windings and to obtain an output from the winding which is rotated with respect to them, so it is possible to use the present arrangement in this reverse fashion. That is, voltages in appropriate (sine/cosine) amplitude relationship can be applied to the windings S1 and C1 of the transformers S and C and an output voltage can then be taken between the common connection 7 and the connection 8 to the toothed member 1. The magnitude and sign of this output voltage would depend both on the relative mechanical position of the strips s with respect to the toothed member 1, and on the amplitude ratio of the applied voltages.

When used in this reverse fashion, there are two relative positions per tooth pitch at which, for any given amplitude ratio of the applied voltages, the output voltage between connections 7 and 8 approximates to zero. Operated in this manner the arrangement can be used in a servo system, and as with a resolver synchro it can be only one of the two null positions within each tooth pitch which will be stable.

As operation in this reverse fashion may be the most important use of the arrangement it is of interest to consider it more fully. If voltages are applied to windings S1 and C1 of amplitudes $E \cos \theta$ for transformer S and $-E \sin \theta$ for transformer C, where $\theta$ is an input variable, then if one assumes a sinusoidal variation of capacitance with variation of relative position between the toothed member and the strips connected to transformer S (the variation being cosinusoidal for the transformer C) the output between connections 7 and 8 due to transformer S alone is proportional to $$E \cos \theta \times \sin \phi \quad \text{(i)}$$

and that due to transformer C alone is proportional to $$-E \sin \theta \times \cos \phi \quad \text{(ii)}$$

where $\phi$ is an angle which is proportional to the relative mechanical displacement of the strips in relation to a given datum on the toothed member and which varies through 360° for a displacement of one tooth pitch.

The total output is the sum of (i) and (ii)

$$= E \cos \theta \sin \phi - E \sin \theta \cos \phi$$
$$= E(\cos \theta \sin \phi - \sin \theta \cos \phi)$$
$$= E \sin (\phi - \theta)$$

It will be seen that there is a null output when $\phi = \theta$ and also when $\phi = \theta + \pi$.

With the conducting strips s at right angles to the direction of relative movement of the members, it has been found advantageous to skew the "teeth" on the toothed member in order to obtain variations of voltage amplitude with displacement which approximate more closely to a sinusoidal form, particularly when the profile is not "ideal" (that is it does not inherently give a sinusoidal variation) and there is a relatively small air gap between the strips and the teeth. Alternatively, with the generating lines of the "tooth" profile at right angles to the direction of relative movement, the strips s could be skewed. In the first case the length of the strips should be appreciably more than the width of the teeth (that is, at right angles to the plane of the drawings) and in the second case the width of the teeth should be appreciably more than the length of the strips, so that in either case relative transverse movement of the members will have no effect on the output.

It is realized that manufacturing errors will always be present, and means may be introduced for correcting cyclic output errors resulting from this. These output errors fall into three categories, namely channel unbalance, inter-channel unbalance and non-orthogonality.

By channel unbalance is meant errors in the capacitive balance of either of the centre-tapped transformers S and C and/or the components associated therewith. Any unbalance in this respect would appear as though the centre-tap of the transformer winding were misplaced towards one end, and the error so produced is cyclic, with a period corresponding to movement through one tooth pitch. Balance can be achieved by means of the modification shown in FIG. 3, in which each of the two transformer windings S2 and C2, instead of a centre-tap, has connected across a centre section of it an adjustable low resistance potentiometer Ps2, Pc2 the adjusting member of which is connected to the common connection 7. Alternatively differential trimming capacitances could be connected to the connections to the transformer windings S2 and C2 so as to be in parallel with the capacitances between the strips and the toothed member.

By inter-channel unbalance is meant capacitive unbalance between the strips connected to transformer S on the one hand and those connected to transformer C on the other hand. This is a second harmonic function which passes through zero when there is zero transmission through either the sine or the cosine channel (each transformer and its associated components being considered as a channel). From the point of view of compensation for such an error, one channel can be taken as a reference channel and the other channel can be modified to balance it. Taking transformer S as the reference channel this compensation can be achieved, as shown in FIG. 4, by adding to transformer C a winding C3 of a few turns, connecting this winding in series aiding or series opposition with the winding C1 of this transformer, and connecting across the winding C3 an adjustable low resistance potentiometer Pc3: the connections to the winding C3 are then made at the adjusting member of this potentiometer Pc3 and at the remote end of the winding C1.

By non-orthogonality is meant a cyclic error corresponding to that arising in a resolver synchro due to the axes of its windings not being at right angles to each other. This error is also found to be a second harmonic function, but it passes through its maximum absolute values when there is zero transmission through the sine or cosine channel so that if the inter-channel unbalance is regarded as sinusoidal, the non-orthogonality error is cosinusoidal.

This error can be trimmed out by introducing a compensatory cross-coupling between the two channels, for instance in the manner illustrated in FIG. 5, namely by adding to the transformer S of the reference channel a winding S3 of a few turns across which is connected an adjustable potentiometer P$s$3 an adjustable portion of which (as appropriate for the compensation to be effected) is connected in series with the adjustable member of the potentiometer P$c$3 connected across the inter-channel unbalance compensating winding C3 on the other transformer.

To avoid spurious unbalance effects arising from leakage resistance, it is advantageous to apply the so-called guard ring technique by providing around the strips and their connections a conductive screen (not shown) which crosses any possible electric leakage path between the toothed member and any strip and which is connected to the common connection 7. This localizes leakage current so that it flows in the transformer winding and not in the external circuit.

By way of example of the accuracy obtainable it has been found that indication or control of position to an accuracy equivalent at least to 0.001″ might be obtained with a profile section consisting of a series of circular arcs (FIG. 2) having a "tooth pitch" of 0.1″ and with 160 strips .02″ wide, the air gap being 0.02″.

As another example the same degree of accuracy was obtained from a standard gear tooth profile of 0.5″ pitch with 100 conducting strips of 0.1″ wide, the width of the interaction zone being ½″ and the air gap 0.04″, with a skew of 15°.

As has previously been stated the invention is not limited to four strips per tooth pitch, although it is contemplated that this would be the most convenient number. Above that number, the transformer arrangements for correlating the capacitance variations involve more complex transformer configurations. With the minimum number of three strips per tooth pitch an arrangement such as that illustrated by FIG. 6 may be used. In this figure, in which the toothed member has not been shown but its tooth pitch P has been marked, the strips $s$ are connected over pole pitches as before, this time into three sets. Thus connection is made between the first, fourth, seventh, . . . strips (connection 9), between the second, fifth, . . . strips (connection 10) and between the third, sixth, . . . strips (connection 11). The correlating transformer arrangement is in this case constituted by three separate transformers.

The embodiment of FIG. 7 to which the modifications represented by FIGS. 2–5 are equally applicable, corresponds to that of FIG. 1 except that, as regards the strips $s$ connected into four sets by the connections 3, 4, 5 and 6, the centre-to-centre spacing of successive strips in the same set (e.g. strips $s$1 and $s$5) is no longer equal to one tooth pitch (P) but is now equal to an integral plural number ($m=3$) of tooth pitches. Thus there are four electrically independent sets of strips with an equal number of interconnected strips, three tooth pitches apart, in each set. Moreover all the strips are equally spaced with a centre-to-centre spacing between adjacent strips (e.g. $s$1 and $s$2) equal to $m/n = ¾ = (1-¼)$ of a tooth pitch, that is, to one tooth pitch less one tooth pitch divided by the number of sets. Considering the two members 1 and 2 in the positional relationship shown in FIG. 7, the strip $s$2 is immediately opposite the apex of a tooth, as are also strips $s$6, $s$10, . . . Strips $s$4, $s$8, . . . are each half-way between two teeth and therefore opposite the base angle between these teeth, strips $s$1, $s$5, . . . lie opposite points half-way along the right-hand flanks of respective teeth, and strips $s$3, $s$7, . . . lie opposite points half-way along the left-hand flanks of respective teeth. The capacitive coupling between the strips $s$1, $s$5, . . . and the toothed member 1 is therefore the same as that between the strips $s$3, $s$7, . . . and the toothed member 1, so that there will be substantially equal but opposite currents in each half of the transformer winding (S2) to which these strips are connected and therefore zero or minimum output from the other winding S1 of the transformer S. On the other hand not only will the capacitive coupling between strips $s$2, $s$6, . . . and the toothed member 1 be different from that between strips $s$4, $s$8, . . . and the toothed member, but the difference will be a maximum. The difference between the currents in each half of the transformer winding (C2) to which these strips are connected will therefore be a maximum, so that the voltage induced in the winding C1 of the transformer C will also be a maximum. On relative movement between the strips $s$ and the toothed member 1 in the direction $d$ (in either sense), the output voltage in winding S1 of the transformer S will gradually increase, and that in winding C1 of transformer C will gradually decrease, until after relative movement through a quarter of a tooth pitch, when strip $s$1 or $s$3 will be opposite the peak of a tooth and the other of these two strips will be opposite the base angle between two teeth, the output voltage of transformer S will be a maximum, and that of transformer C will be minimum. It will be seen therefore that the embodiment of FIG. 7 functions in an exactly similar manner to that of FIG. 1 but with somewhat less sensitivity due to the greater spacing of the strips in relation to the pitch of the toothed profile.

What I claim is:

1. Apparatus for providing electrical signals indicative of positional relationship, comprising two relatively movable members of which the first has an electrically conductive surface having a toothed profile and the second has a plurality of equally spaced conductive strips which, being disposed in sensible capacitive proximity to the teeth of the first member and extending transversely of the direction of relative movement between the two members, are connected together into at least three sets and have a centre-to-centre spacing between adjacent strips which is related to the tooth pitch by the expression $m = pn \pm 1$ where $n$ is the number of sets of strips, greater than 2, $p$ is an arbitrary number which can be zero, and $m$ is an integral number of tooth pitches corresponding to the centre-to-centre spacing of successive strips of the same set, each set being constituted by strips which have a similar positional relationship to respective teeth of the first member and the several sets being connected to a transformer arrangement for correlating in a positional output signal therefrom the cyclic variations of capacitance which will occur between the toothed member and the several sets of strips during relative movement between the two members.

2. Apparatus for providing electrical signals indicative of positional relationship, comprising two relatively movable members of which the first has an electrically conductive surface having a toothed profile and the second has a plurality of equally spaced conductive strips, at least three per tooth pitch, disposed in sensible capacitive proximity to the teeth of the first member and extending transversely of the direction of relative movement between the two members, those strips which have a similar positional relationship with respect to the teeth of the first member being electrically connected together as a set, and the several sets, corresponding in number to the number of strips per tooth pitch, being connected to a transformer arrangement for correlating in a positional output signal therefrom the cyclic variations of capacitance which will occur between the toothed member and the several sets of strips during relative movement between the two members.

3. Apparatus for providing electrical signals indicative of positional relationship, comprising two relatively movable members of which the first has an electrically conductive surface having a toothed profile and the second has a plurality of equally spaced conductive strips which, being disposed in sensible capacitive proximity to the teeth of the first member and extending transversely of the direction of relative movement between the two members, have a centre-to-centre spacing between adjacent strips which differs from an integral number of tooth pitches by a distance equal to one tooth pitch divided by an integer greater than two, those strips which have a similar positional relationship to respective teeth of the first member being electrically connected together as a set, and the several sets, equal in number to said integer greater than two, being connected to a transformer arrangement for correlating in a positional output signal therefrom the cyclic variations of capacitance which will occur between the toothed member and the several sets of strips during relative movement between the two members.

4. Apparatus as claimed in claim 1 in which the second member has four strips per tooth pitch.

5. Apparatus as claimed in claim 4 in which the transformer arrangement comprises first and second transformers each having inductively coupled first and second windings, the first strip and every fourth strip therefrom are connected together and to one end of the second winding of the first transformer, the third strip and every fourth strip therefrom are connected together and to the other end of that winding, the second strip and every fourth strip therefrom are connected together and to one end of the second winding of the second transformer, the fourth strip and every fourth strip therefrom are connected together and to the other end of this last winding, and a common connection is made to points which in effect are substantially mid-way between the ends of said second windings of the two transformers.

6. Apparatus as claimed in claim 5 in which the second transformer has a third winding which is connected in series with its first winding and which has an adjustable potentiometer connected across it, said first winding having external connections therefor connected to the adjusting member of this potentiometer and to the remote end of the first winding.

7. Apparatus as claimed in claim 6 in which the first transformer has a third winding having a further adjustable potentiometer connected across it an adjustable portion of this potentiometer being connected in series with the adjusting member of the aforesaid potentiometer connected across the third winding of the second transformer.

8. Apparatus as claimed in claim 5 including adjustable potentiometers connected across centre sections of said second windings of the two transformers respectively, said common connection being connected to the adjusting members of these potentiometers.

9. Apparatus as claimed in claim 5 in which the two transformers have respective third windings having respective adjustable potentiometers connected across them, the first and third windings of the second transformer being connected in series and external connection for the first winding of the second transformer being connected respectively to the end of this winding remote from its series connected potentiometer and to the adjustable member of this potentiometer through an adjustable portion of the potentiometer across the third winding of the first transformer, and in which also the second windings of the two transformers have further adjustable potentiometers respectively connected across centre sections thereof with said common connection connected to the adjustable members of said further potentiometers.

10. Apparatus as claimed in claim 1 wherein the toothed profile of the first member comprises a series of curves approximating to arcs of circles and subtending angles of 90° at the centres of such circles, said curves meeting each other substantially at right angles.

References Cited by the Examiner
UNITED STATES PATENTS 2,527,215 10/1950 Hahn _____ 323—93 X
2,674,729 4/1954 Carter _____ 323—93 X LLOYD McCOLLUM, *Primary Examiner.*

W. E. RAY, *Asst. Examiner.*